United States Patent
Harvey

[15] 3,658,588

[45] Apr. 25, 1972

[54] PREPARATION OF STARCH FROM CELLULOSE TREATED WITH PHOSPHORIC ACID

[72] Inventor: James R. Harvey, 320 Elliot Rd., Monroeville, Pa. 15146

[22] Filed: Feb. 4, 1970

[21] Appl. No.: 8,705

[52] U.S. Cl. ................................127/36, 127/37
[51] Int. Cl. ..........................................C08b 15/00
[58] Field of Search ...............................127/37, 36

[56] References Cited

UNITED STATES PATENTS 2,526,607  10/1950  Kurth........................................127/37

OTHER PUBLICATIONS

Chemical Abstracts, 54:P13703d (1960).

Primary Examiner—Morris O. Wolk
Assistant Examiner—Sidney Marantz
Attorney—Ronald J. Kubovcik

[57] ABSTRACT

Method of preparing an edible starch from a cellulose, such as cotton, by treating the cellulose with phosphoric acid.

2 Claims, No Drawings

PREPARATION OF STARCH FROM CELLULOSE TREATED WITH PHOSPHORIC ACID

The present invention relates to the hydrolyzed products of celluloses prepared by phosphorylyzing cotton, wood, leaves, grass, paper and other sources of cellulose with concentrated phosphoric acid and then hydrolyzing that phosphorylyzed cellulose. The phosphoric acid is removed by water or solvent washing the products which are starches and sugars. If phosphorylyzed cellulose is dehydrated by concentrated sulfuric acid in the presence of glycol or glycerol, an epoxy will result.

No patent or publication to date has outlined a method of producing starch from cellulose. A number of patents involving the treatment of cellulose with phosphoric acid have been previously disclosed, but these treatments have been entirely a review of methods for phosphating cellulose for use as sizing agents, finishing agents, dye-dispersing agents, detergent additives, binding agents, creaming agents, stabilizing agents, adhesive agents, mud modifiers for well drillings, and flame resistant materials. U.S. Pat. No. 2,759,924 claims to have incorporated phosphorus into the cellulose molecule on the order of 6 percent. Several publications indicate degradation by phosphoric acid to sugars. Publication No. 10, 163, Diss. Abstr. Vol. 14, PP. 2189 found exception to the classical cellobiose concept of cellulose by identifying isomaltose from cotton. British Pat. No. 104173 claims to hydrolyze cellulose to sugars in acid baths. One acid used was phosphoric acid. In this process the sugars are then freed of acid and fermented to alcohol.

My invention also outlines a method of sequential phosphorylysis and hydrolysis of cellulose to glucose sugars with the phosphoric acid being entirely removed and recovered with ethyl ether and absolute alcohol.

The yield from my invention of starches or sugars from pure cellulose is greater than 100 percent due to the water added by hydrolysis of the glucoside bonds and the controlled attack of the acids employed. The starch prepared from cotton by my invention yields a maltose on the order of 15 percent when hydrolyzed by diastase. This product has a molecular weight comparable to starches and gives the iodine-starch color complex. The beta-glucoside-linked starch is not reactive with iodine unless concentrated sulfuric acid is added incrementally to the phosphoric acid and cellulose solution until a peak in viscosity has been passed.

The cotton-prepared starch or the beta-glucoside-linked starch are prepared by treating the appropriate cellulose with concentrated phosphoric acid for 4 hours at room temperature with agitation. If wood or paper containing lignin is used as the source of cellulose, the lignin will remain insoluble in the phosphoric acid and can be removed on a non-cellulose suction filter before the hydrolyzing step.

In the hydrolysis reaction water replaces the the phosphoric acid radical on the cleaved glucoside bonds of the cellulose molecule making a starch. The starch is then freed of the phosphoric acid by washing on a fine sintered filter. The water will contain the phosphoric acid which can be concentrated by physical means.

Cellulose in concentrated phosphoric acid at approximately 70–71° C can be converted into glucose sugars by sequential phosphorylyzation and hydrolysis. Higher temperatures have been used for faster results. The mechanism of sequential phosphorylyzation and hydrolyzation alternates the quenching of the dehydration potential of concentrated phosphoric acid at 70° C between the cleaving of glucoside bonds and the hydration by water. The solution must be agitated and water must be added incrementally within defined limits. The preferential order of quenching the dehydration potential of concentrated phosphoric acid at 70° C is first water, secondly the No. 1 and No. 4 carbons of the glucose units from the cleaved glucoside bonds, and thirdly the dehydration of the glucose units to furfurals. The quenching is limited to the first and second preferences of the phosphoric acid. The development of an intensifying carmel color indicates the need for addition of water. Over-addition of water is indicated by a viscosity plateau or by gelled lumps. The addition makes water available to quench and replace the phosphoric acid radicals on the No. 1 and No. 4 carbons of the glucose units of cleaved glucoside bonds to form a permanent hydrolysis. The molecular weight of the cellulose will drop, as indicated by the viscosity, until only glucose sugars remain in the concentrated phosphoric acid. The absence of any precipitation after 24 hours, upon dilution with water of a small test sample of the solution, indicates the presence of only glucose sugars in the concentrated phosphoric acid. Ethyl ether is then added with mixing to the solution of glucose sugars and concentrated phosphoric acid until miscibility is achieved. At this point excess ethyl ether is added until all the glucose sugars precipitate from the solution. The sugars are recovered by rapid filtration and will contain residual phosphoric which is removed by washing the sugars in a minimal volume of absolute methanol or absolute ethanol. Ethyl ether is again added with mixing until all glucose sugars are precipitated. The precipitate is collected on a filter. The washing procedure with alcohol and ether is repeated until the phosphoric acid removed. The ethyl ether, alcohol and phosphoric acid are all retrievable by physical separation.

Amylopectin can be formed by adding small amounts of concentrated sulfuric acid with agitation to a solution of cellulose in phosphoric acid. The cleaved beta glucoside bonds will mutarotate in this solution. The dehydration coupling forced by the concentrated sulfuric acid reforms 1–16 alpha glucoside bonds and 1–4 alpha glucoside bonds as evidenced by the amylopectin color reaction with iodine. The mutarotation to the anomer linkage of beta-glucoside can be observed by tagging separate solutions of phosphorylyzation and of dehydration with small amounts of iodide-iodate. The alpha glucoside-linked starch-iodine color complex develops only in agreement with the substrate specificity of diastase and oligo 1–6 glucosidase. This reaction of ether bonding ceases when the viscosity drops. The peak in viscosity becomes apparent after the addition of excess concentrated sulfuric acid.

The formation of cellulose epoxies is achieved by adding with agitation glycol or glycerol to the solution of cellulose and phosphoric acid at room temperature. The glycol is epoxified to the cellulose by slowly adding with agitation small amounts of concentrated sulfuric acid until the viscosity reaches a peak. At this point the two acids are removed by washing the epoxy on a sintered suction filter. The epoxy is not poisoned by the water and all the acids are washed out. A similar grafting with glycerol occurs as epoxy bonds are formed with the second, third and fifth carbons of the glucose units. (i.e. the oxygen connects two different carbon atoms which are already united in some other way.)

Cellulose in the finely divided state is preferred and a larger ratio of cellulose to phosphoric acid than cited in the examples can be employed.

EXAMPLE I

Two parts of cotton are mixed at room temperature (20°–30° C) with 170 parts of ortho phosphoric acid (85 percent). After mixing for four hours two hundred parts water are added and mixed for 30 minutes. The solution is cooled with mixing to approximately 4° C. and filtered with mixing on a fine Buchner sintered suction funnel. The resulting starch is washed with water at approximately 4° C. and agitated on the filter until free of phosphoric acid. The starch yields a maltose on the order of 15 percent when treated with diastase. The product also gives the iodine-starch color complex.

EXAMPLE II

Two parts of cellulose, other than cotton, are mixed at room temperature with 170 parts of ortho phosphoric acid (85 percent). After mixing for four hours, 200 parts of water are added, the solution is mixed for 30 minutes, then cooled to approximately 4° C, with mixing, and filtered on a fine sintered Buchner funnel. The resulting beta-glucoside-linked starch is washed with water at 4° C on the funnel with mixing until free of phosphoric acid. This starch is a nutritious flour for humans and has dietetic value. Its molecular weight is comparable to that of starches in general, however, it does not form the iodine-starch color complex.

EXAMPLE III

Six parts of cellulose, other than cotton, are mixed at room temperature with 170 parts of ortho phosphoric acid (85 percent). After the solution is mixed until a clear viscous liquid results, two parts of concentrated sulfuric acid are slowly added three times in succession with mixing. The resulting amylopectin is allowed to set for 2 hours. Two hundred parts of water are added and mixed for 30 minutes. The solution is cooled to approximately 4° C with mixing and filtered on a fine sintered suction filter. The resulting amylopectin is washed with agitation on the filter, using water at 4° C until free of acids. The amylopectin has a molecular weight comparable to starch and give the amylopectin color complex when dried twice in the presence of iodide-iodate.

EXAMPLE IV

Ten parts of cellulose are mixed with 200 parts of ortho phosphoric acid (85 percent). The solution is agitated until a clear viscous liquid results. The temperature is then brought to 70° – 71° C with agitation. One part of water is added when a slight carmel color develops or when the carmel color intensifies. Any addition of water in excess will stop the mechanism of degradation at a viscosity plateau and may form gel lumps. Failure of a test sample to precipitate upon dilution with water after 24 hours, indicates formation of glucose sugars from the cellulose. If there is a precipitate, the mechanism of degradation is continued. When no precipitate is present in a test sample after 24 hours, ethyl ether is added to the solution with mixing until miscibility with phosphoric acid is achieved. At this point ethyl ether is added until all the glucose sugars precipitate. The glucose sugars are removed by filtration, which must be rapid to prevent evaporation of ethyl ether, and mixed with 20 parts absolute methanol. Again ethyl ether is added to alcohol and sugar solution until all the glucose sugars are precipitated. The sugars are removed by filtration again. The washing procedure using ethyl ether and methanol may be repeated until the glucose sugars are freed of the phosphoric acid.

EXAMPLE V

Six parts of cellulose are mixed at room temperature with 170 parts of ortho phosphoric acid (85 percent). The solution is agitated for 4 hours or until a clear viscous liquid results. Three parts of glycerol are added with agitation to the solution. Two parts of concentrated sulfuric acid (95 percent to 98 percent) are added slowly three times in succession, with agitation. After setting 2 hours the solution is diluted with 200 parts of water and agitated for 30 minutes. The epoxy so formed is then caught on a sintered suction filter. Additional water washings are conducted on the suction filter until the epoxy is free of acids.

I claim:

1. A method for preparing from a cellulose a starch suitable for human consumption, said starch being essentially linear and water insoluble and consisting essentially of 1–4 glucosidic linkages at least 85 percent of which are of the beta-type, comprising the steps of:
    a. contacting in solution 1 to 2 percent by weight of said cellulose with 98–99 percent by weight of a phosphoric acid having a concentration of about 85 percent at a temperature of from 20° to 30° C and for a time sufficient to solubilize said cellulose in the phosphoric acid;
    b. adding to the solution in (a), at least 115 percent by weight, based on the total weight of the cellulose and phosphoric acid, of water;
    c. agitating the mixture formed in (b) for a time sufficiently long to cause a complete precipitation of the starch from the mixture, and
    d. thereafter removing the phosphoric acid, and other impurities formed in steps (a), (b) and (c), from the starch by means of filtering and water washing.

2. The method of claim 1 wherein said cellulose is cotton.

* * * * *